United States Patent
Ikonomov et al.

(10) Patent No.: US 9,266,293 B2
(45) Date of Patent: Feb. 23, 2016

(54) DEPTH MARKING TOOL FOR TIRE REPAIR

(75) Inventors: Metodi Lubenov Ikonomov, Moore, SC (US); Cesar Enrique Zarak, Simpsonville, SC (US); Nathan Joel Panning, Simpsonville, SC (US)

(73) Assignees: Michelin Recherche et Technique S.A., Granges-Paccot (CH); Compagnie Generale des Etablissements Michelin, Clermont-Ferrand (FR)

( * ) Notice: Subject to any disclaimer, the term of this patent is extended or adjusted under 35 U.S.C. 154(b) by 35 days.

(21) Appl. No.: 13/882,049

(22) PCT Filed: Oct. 30, 2010

(86) PCT No.: PCT/US2010/054898
§ 371 (c)(1),
(2), (4) Date: Apr. 26, 2013

(87) PCT Pub. No.: WO2012/057806
PCT Pub. Date: May 3, 2012

(65) Prior Publication Data
US 2013/0213557 A1    Aug. 22, 2013

(51) Int. Cl.
*B29C 73/10* (2006.01)
*B29C 73/12* (2006.01)
(Continued)

(52) U.S. Cl.
CPC ................ *B29C 73/12* (2013.01); *B26D 3/003* (2013.01); *B26D 3/005* (2013.01); *B26D 3/06* (2013.01);
(Continued)

(58) Field of Classification Search
CPC ........................... B29C 73/10; B29L 2030/00

USPC .................. 156/95, 97, 98; 152/367
See application file for complete search history.

(56) References Cited

U.S. PATENT DOCUMENTS

| 907,058 A | 12/1908 | Kraemer |
| 1,395,309 A | 11/1921 | Taber et al. |

(Continued)

FOREIGN PATENT DOCUMENTS

| CN | 1706629 A | 12/2005 |
| CN | 101045285 A | 10/2007 |

(Continued)

OTHER PUBLICATIONS

Machine generated English language translation of DE 3926946 (original document dated Jan. 1991).*

(Continued)

*Primary Examiner* — Martin Rogers
(74) *Attorney, Agent, or Firm* — Hahn Loeser & Parks LLP (57) ABSTRACT

The invention includes methods and apparatus for preparing a tire surface for receiving a tire patch. Such methods include selecting a desired depth marking template for use in forming one or more depth marking apertures within a tire surface and within a desired tire patch application area, each of the one or more depth marking apertures having a desired depth corresponding to a desired depth of the patch receiving area, the template having one or more openings extending through a thickness of the template corresponding to the one or more marking apertures to be formed. The methods further include forming one or more depth marking apertures within the tread by inserting a material removal member of a power tool into each of the one or more openings in the template, the power tool removing tire material to the desired depth for each aperture.

14 Claims, 10 Drawing Sheets

(51) Int. Cl.
*B29C 73/26* (2006.01)
*B26D 3/00* (2006.01)
*B26D 3/06* (2006.01)
*B29L 30/00* (2006.01)

(52) U.S. Cl.
CPC ............. *B29C 73/26* (2013.01); *B29C 73/10* (2013.01); *B29C 2073/264* (2013.01); *B29L 2030/00* (2013.01)

(56) References Cited

U.S. PATENT DOCUMENTS

| | | | |
|---|---|---|---|
| 1,498,683 A | | 6/1924 | Davis |
| 1,569,490 A | * | 1/1926 | Hiscock .................. 156/98 |
| 1,591,816 A | * | 7/1926 | Hawkinson .................. 156/97 |
| 1,753,688 A | | 4/1930 | Boscardin |
| 2,000,300 A | | 5/1935 | Scruby |
| 2,523,319 A | | 9/1950 | Middlestadt |
| 2,678,487 A | | 5/1954 | Onsrud |
| 2,937,576 A | | 5/1960 | Olton |
| 2,985,231 A | | 5/1961 | Roesch |
| 3,190,338 A | * | 6/1965 | Wolfe .................. 152/370 |
| 3,421,411 A | | 1/1969 | Lowry et al. |
| 3,521,408 A | | 7/1970 | Neugebauer |
| 3,739,662 A | * | 6/1973 | Windelman et al. ......... 76/107.1 |
| 3,850,222 A | * | 11/1974 | Lejuene .................. 157/13 |
| 3,860,050 A | * | 1/1975 | Banks .................. 144/144.51 |
| 3,932,965 A | | 1/1976 | Kline, Jr. |
| 4,057,898 A | * | 11/1977 | Piosky .................. 30/289 |
| 4,139,041 A | | 2/1979 | Newton |
| 4,168,730 A | * | 9/1979 | Keller .................. 144/371 |
| 4,230,164 A | * | 10/1980 | Mericle .................. 144/372 |
| 4,319,615 A | * | 3/1982 | Ditmanson .................. 144/144.1 |
| 4,333,686 A | | 6/1982 | Arnswald |
| 4,382,590 A | | 5/1983 | Pandya et al. |
| 4,435,456 A | * | 3/1984 | Hausch .................. 428/63 |
| 4,479,523 A | * | 10/1984 | Peterson et al. ......... 144/144.1 |
| 4,620,407 A | * | 11/1986 | Schmid .................. 52/745.09 |
| 4,644,701 A | | 2/1987 | Arrigoni et al. |
| 4,705,436 A | * | 11/1987 | Robertson .................. 408/72 R |
| 4,817,697 A | * | 4/1989 | Takami et al. .................. 157/13 |
| 5,115,870 A | | 5/1992 | Byrne |
| 5,139,840 A | * | 8/1992 | Ferrara .................. 428/78 |
| 5,350,481 A | | 9/1994 | Shepard et al. |
| 5,445,691 A | | 8/1995 | Nakayama et al. |
| 5,468,100 A | | 11/1995 | Naim |
| 5,540,210 A | | 7/1996 | Jones |
| 5,697,833 A | | 12/1997 | Hislop |
| 5,788,414 A | | 8/1998 | Gordon |
| 6,062,950 A | | 5/2000 | Morgan |
| 6,129,611 A | | 10/2000 | Yamaguchi |
| 6,450,864 B1 | | 9/2002 | Smith |
| 6,461,135 B1 | | 10/2002 | Lagnier et al. |
| 6,623,342 B1 | | 9/2003 | McDonald |
| 7,596,872 B2 | | 10/2009 | Clarke et al. |
| 8,231,428 B2 | | 7/2012 | Poling, Sr. et al. |
| 8,298,040 B2 | | 10/2012 | De Gradi |
| 8,662,134 B2 | | 3/2014 | Lindsay et al. |
| 2002/0066190 A1 | | 6/2002 | Fey et al. |
| 2002/0095810 A1 | * | 7/2002 | Carlson et al. .................. 33/562 |
| 2003/0010802 A1 | | 1/2003 | Blaimschein et al. |
| 2005/0081972 A1 | | 4/2005 | Lopez |
| 2005/0200087 A1 | * | 9/2005 | Vasudeva et al. ............. 279/143 |
| 2005/0236069 A1 | * | 10/2005 | O'Brien .................. 144/144.1 |
| 2007/0232195 A1 | | 10/2007 | Reppel |
| 2008/0005947 A1 | * | 1/2008 | Barna et al. .................. 40/629 |
| 2009/0001642 A1 | * | 1/2009 | Bolton .................. 269/37 |
| 2009/0170405 A1 | | 7/2009 | Barusta |
| 2010/0143060 A1 | * | 6/2010 | Weber et al. ............. 408/241 G |
| 2011/0277898 A1 | | 11/2011 | Barraud et al. |

FOREIGN PATENT DOCUMENTS

| | | | | |
|---|---|---|---|---|
| CN | 101148020 A | | 3/2008 | |
| DE | 3926946 | * | 1/1991 | ............. B29C 73/10 |
| DE | 4442553 A1 | | 11/1994 | |
| FR | 1211507 | * | 3/1960 | ............. B29C 73/10 |
| JP | 2006-346886 | * | 12/2006 | ............. B29D 30/68 |
| RU | 10634 U1 | | 8/1999 | |
| SU | 44448 A1 | | 11/1942 | |
| SU | 380436 | | 11/1972 | |
| SU | 1659223 A1 | | 6/1991 | |
| WO | WO 2009/157941 | * | 12/2009 | ............. B29C 73/00 |
| WO | 2012057806 A1 | | 5/2012 | |

OTHER PUBLICATIONS

Machine generated English language translation of FR 1211507 (original document dated Mar. 1960).*
Tire Repair for Passenger Car and Light Truck Tires Continental Tire North America Nov. 17, 2005.*
Michelin Trukc Tire Nail Hole Repair Procedures Michelin North America, 2007.*
Changing Dovetail Width with a Fixed Jig tomsworkbench.com, Apr. 2010.*
A Shipwriht in Training: Hundredths of an Inch in Wood and Metal daviddanielsdesigns.com, Apr. 2008.*
Me Making a Violin Sam Harper, poorfolkbows.com, Jul. 2009.*
Sculpted Rocking Chair: Shaping the Seaet thecraftsmanspath.com, Mar. 2009.*
Machine generated English language translation of JP 2006-346886 (original document dated Dec. 2006).*
PCT/US2010/054898 International Search Report and Written Opinion dated Dec. 23, 2010, 12 pages.
Michelin Truck Nail Hole Repair Procedures, Michelin 2007, 6 pages, retrieved from internet <URL:www.michelintruck.com/assets/pdf/NailHoleRepairManual.pdf>.

* cited by examiner

DEPTH MARKING TOOL FOR TIRE REPAIR

This application is a National Stage application of International Application No. PCT/US2010/054898, filed Oct. 30, 2010, to which this application claims priority and the benefit of, the disclosure of which is also hereby incorporated by reference.

BACKGROUND OF THE INVENTION

1. Field of the Invention

The invention relates generally to methods and apparatus for preparing tires for repair. More specifically, this invention relates to methods and apparatus for preparing tires for application of a tire patch.

2. Description of the Related Art

It is commonly known to use tire patches to repair damaged portions of a tire. It is also known that tire patches may form any of a variety of shapes and sizes. In preparing the tire for receiving a tire patch, the corresponding surface of the tire is prepared to improve patch adhesion and arrangement. In certain instances, the surface is simply cleaned and/or roughened. In other instances, it is desirous to remove sufficient material from the tire to form a recessed area for receiving a tire patch. This area is referred to as a patch receiving area.

In removing material for forming the patch receiving area, it is often desirous to control the removal of the material to ensure that a particular depth is achieved. For example, it may be desirous to ensure that any reinforcements (i.e., fabric, cords, strand, or the like) are not damaged by the removal process. Further, it may be desirous to reach a particular depth to expose a certain layer or material, or to otherwise simply reach any other desired depth.

Presently when forming the patch receiving area according to manual methods, an operator freely utilizes an unconstrained abrading tool to remove material from the tire. In performing such operation, the operator must not only control the position of the tool in all directions along the surface, but must also monitor the continued removal of such material to achieve a desired depth. This process may become an iterative process, as the operator interrupts the removal process to determine whether the present depth has reached, or not gone beyond, the desired (i.e, target) depth. Accordingly, there is a need to better control the formation of the patch receiving area of a tire for manual operations.

SUMMARY OF THE INVENTION

Particular embodiments of the present invention include methods and apparatus for preparing a tire surface for receiving a tire patch. Particular embodiments of the method include the step of selecting a desired depth marking template for use in forming one or more depth marking apertures within a desired tire surface and within a tire patch application area, each of the one or more depth marking apertures having a desired depth corresponding to a desired depth of the patch receiving area, the template having one or more openings extending through a thickness of the template corresponding to the one or more marking apertures to be formed in the tire. Further steps may include selecting a material removal member for use with a power tool, the removal member being capable of forming one or more depth marking apertures into the tire surface using the depth marking template. Further steps may include applying the template against the desired tire surface and forming one or more depth marking apertures within the tread by inserting the material removal member into each of the one or more openings in the template, the member being rotatably attached to the power tool and removing tire material to a desired depth for each aperture, and removing the template from the tire surface. Additional steps may also include removing the remaining tire material within the patch receiving area to an approximate depth of the one or more apertures.

A further embodiment includes a template for use with a power tool to create one or more depth marking apertures in a tire surface to assist in the formation of a recessed patch receiving area within the tire, the template comprising: a body having a top surface, a desired thickness extending between the top surface and a bottom surface, and a perimeter containing the thickness, the perimeter forming a desired shape, the shape generally matching the shape of a desired tire patch. The template further comprises a plurality of openings extending through a thickness of the body.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Particular embodiments of the present invention provide methods and apparatus for preparing a surface of a tire for receiving a tire patch, which is referred to herein as the tire patch area or patch receiving area. It is known that it may be desirable to repair or reinforce a particular area of a tire, such as, for example, when the tire is damaged during tire operation. This damaged area may be located anywhere on a tire, such as in the sidewall, the shoulder, or the tread areas. Typically, the area to be patched is prepared before receiving the patch to promote adhesion of the patch. For example, the surface may be cleaned with a solution and/or by a buffing or abrading operation. For particular patches, it is desirous to recess the patch into the tire surface by removing material from the surface sufficient to form a patch receiving area having a desired depth. Generally, the inventive methods and apparatus concern the formation of depth marking apertures within a tire surface to guide an operator during manual formation of the patch receiving area, where the apertures extend into the tire to a target or desired depth. The aperture depth may be selected to approximate the desired depth of the tire patch receiving area. Once the depth markings are formed, the operator is then able to remove the material surrounding the apertures to a depth consistent with the depths of adjacent apertures to form the tire patch receiving area.

Particular embodiments of such methods include the step of selecting a tire surface along the tire within which a tire patch receiving area will be formed. It is known that it may be desirous to repair or reinforce a particular area of tire, such as, for example, when the tire is damaged during tire operation. This area may be located anywhere on the tire, such as the sidewall, shoulder, or tread areas. The repair or reinforcement may include applying a tire patch to the desired area. Typically, the area is prepared before receiving the patch to promote adhesion of the patch. For example, the surface may be cleaned with a solution and/or by a buffing or abrading operation. For particular patches, it is desirous to recess the patch into the tire surface by removing material from the surface sufficient to form a patch receiving area having a desired depth. The depth of the patch receiving area may extend a constant or a variable depth from the original tire surface.

Particular embodiments of such methods include the step of selecting a desired depth marking template for use in forming one or more depth marking apertures within a desired tire surface and within a tire patch application area, each of the one or more depth marking apertures having a desired depth corresponding to a desired depth of the patch receiving area, the template having one or more openings extending through a thickness of the template corresponding to the one or more marking apertures to be formed in the tire. The one or more openings extending through the thickness of the template are provided to control a material removal member as it forms each of the one or more marking apertures in the tire. The one or more openings may form slots to create one or more marking apertures also forming slots. The one or more openings may also form holes to create one or more marking apertures also forming holes. Generally defining the desired depth of the patch receiving area indicates that there may be a slight deviation between controlled depth of each marking aperture and the desired depth of the patch receiving area. The thickness of the template is provided such that the insertion of a material removal member into each of the one or more openings forms a marking aperture in the tire having a desired depth as the member extends fully into each opening within the template until reaching a stop. In particular embodiments, the stop is a spacer or a collar having a desired thickness or a desired outside diameter to control, in conjunction with the thickness of the template, the depth to which the material removal member extends into the tire.

The template may be flexible and formed of any flexible material to allow the template to bend and adapt to one or more curvatures in the tire. Flexible materials include polymers, plastics, elastomers (natural or synthetic), and even chain-linked metals. It is also possible to form the template of a more rigid material that generally resists any bending, whereby the template is molded to one or more contours of the tire to which the template is intended to be applied. While any sufficient material may be used, examples include plastics and metals. It is understood that when the template is rigid, the tire may be adapted to the bottom surface of the template, which may form a curved surface, in lieu of the template adapting to a surface of the tire. The template may also form a composite, such as when constructing the template using layers of different materials, embedding one or more materials within the template, such as by molding material about an internal material, or when using particular materials to enhance or reinforce the template at particular locations (such as forming the top surface or a portion thereof from a more durable and/or more wear resistant material, while the remainder of the template is more flexible). The template may be molded, machined, or otherwise formed through any known process.

In particular embodiments, the depth marking template includes an outer perimeter surrounding the one or more openings, the outer perimeter of the template generally forming a shape of the desired tire patch for application to the tire patch receiving area. By providing a perimeter generally shaped to the patch, the template openings function to facilitate the formation of marking apertures within the patch receiving area. Further, an operator may then be able to circumscribe the perimeter to form a boundary mark defining the outer perimeter of the patch receiving area of the tire. This perimeter can be used by the operator as a guide to limit his or her removal of material within the patch receiving area. It is understood that the perimeter of the template may form any desired shape, including for example: any polygon, such as a rectangle, square, or trapezoid; any ellipse, such as a circle and oval; and any other arbitrary shape.

Particular embodiments of such methods include the step of applying the template against the desired tire surface. In order to form the tire markings in the desired or intended area to form a patch receiving area, the template is applied or placed along the desired tire surface and fixed in position. Fixing entails maintaining the template in any desired position, which may be achieved by any method known to one of ordinary skill in the art, such as by manual force (such as by hand, by use of a hand tool or handle), an adhesive, or any means of clamping or forcefully maintaining the template in position. When fixing by hand, an operator may manually force the template against the tire surface. In particular embodiments, the operator may utilize a handle portion extending from the template. When using an adhesive, a temporary adhesive may be employed around a bottom tire-engaging surface of the template. When employing a clamping or forcing means, such means may include, for example, vice grip, a clamp pinching the template between interior and exterior tire surface, a means extending from an opposing interior tire surface, or a means pulling the template against the tire surface, such as when the clamping or forcing means extends through a damaged portion of the tire to engage an outer tire surface. The bottom tire engaging surface of the template may be texturized to better resist any movement during the step of fixing. Applying texture may comprise any means known to one of ordinary skill in the art, and may include, for example, applying a texturized tape, applying sandpaper, molding texture or small protrusions or pins extending from the bottom surface, or coating the bottom surface with any known texturized material. The bottom surface may also be roughened by any known means.

Particular embodiments of such methods include the step of forming a mark on the tire surface about at least a portion of the depth marking template to identify a patch receiving area on the tire surface. This step is useful to provide an indicator informing the operator of an outer perimeter of the patch receiving area. Once marked, an operator may then use the marks as a guide to limit the removal of material to the material within the marked perimeter of the template. In particular embodiments, the entire perimeter may be circumscribed or marked or only a portion or portions may be circumscribed or marked. Accordingly, further embodiments include the step of forming a mark on the tire surface being accomplished by tracing at least a portion of a perimeter of the depth marking template. A marking device may be used to generate the mark, which may comprise any known device capable of providing a mark along the tire surface, whether the mark is achieved by depositing a material on the surface, such as ink or paint by way of a pen, for example, or by sufficiently deforming or removing material from the surface, such as when using a sharp edge to scrap, cut, or abrade material from the tire surface. In particular embodiments, the tire patch perimeter is generally the same size as the tire patch perimeter. In further embodiments, a perimeter of the depth marking template is approximately shaped to the patch to be received by the patch receiving area. It is also understood that a material removal tool may be used to translate about at least a portion of the perimeter to remove material from the tire to form at least a portion of the patch receiving area perimeter. In particular embodiments, the tool removes the material to a desired depth of the patch receiving area or the depth of the depth marking apertures.

Particular embodiments of such methods include the step of selecting a material removal member for use with a power tool, the removal member being capable of forming one or more depth marking apertures into the tire surface using the depth marking template. Any tool known to one of ordinary skill in the art that is capable of removing material from the tire surface may be selected. In particular embodiments, the tool may be a powered rotary tool. The rotary tool may include a rotary output shaft for transmitting rotational forces and a material removal member operably attached to the output shaft and aligned axially with the output shaft. The material removal member, for example, may be a drill bit or a hole plunger operably connected to a rotary tool such as a pneumatic or electric drill or the like. By further example, the material removal member may be a rotary cutting, abrading, or grinding disk operably connected to a pneumatic or electric rotary tool. In a final example, the material removal member may be a heated cutting blade operably connected to a grooving iron (i.e., tire groover), which is disclosed according to particular exemplary embodiments in U.S. Pat. No. 2,230,042, which is incorporated herein by reference.

Particular embodiments include the step of selecting and installing a template-engaging guide onto the power tool, the guide being selected to engage the depth marking template upon fully inserting the material removal member into any of the one or more openings in the template. A guide for engaging the template may be installed onto the material removal member or tool to improve the translation of the material removal member or tool across the template. For example, the guide may form a rotatable collar having a template-engaging surface located at an outer diameter of the collar. The collar may mount to a driven rotary shaft of the material removal tool while remaining generally freely rotatable, whereby a bearing is interposed between the shaft and the collar to significantly reduce the transmission of rotatable forces from the shaft to the collar. The collar may also have a desired width for engaging the template and one or more ridges extending outwardly from the template-engaging surface, whereby each of the one or more ridges extend into one of the apertures of the template to guide the tool along the template. In a particular embodiment, the guide may form a spacer having a skid surface for sliding along the top surface of the template. The skid surface and/or the top surface of the template may be formed of or coated with a low friction material facilitating a lower resistance translation of the material removal tool along the template during depth marking aperture formation.

The guide may also assist in controlling the depth of each marking aperture formed in the tire surface by the material removal member. Accordingly, particular steps of the present invention include the tool guide being sized to achieve a desired depth for each of the one or more depth marking apertures to be formed in the tire The depth of each of the one or more marking apertures formed in the tire surface by the material removal member is controlled by how deep a particular material removal member penetrates the tire. For example, the outer diameter associated with the tire engaging surface of the collar controls the penetration depth of the material removal member. The ability of the guide to limit the penetration of the material removal member into the tire is in addition to the template, as the template thickness also limits the penetration of the material removal member. By adjusting the size of the guide, the depth of any aperture formed by the material removal member may be further controlled. For example, if the guide is a rotatable collar, a collar may be selected based upon the outer diameter of the collar if desiring to achieve a desired marking aperture depth. When the material removal member is a rotatable disk, the collar radius is generally smaller than the major radius of the material removal member, and the material removal member major radius minus the sum of the thickness of the template and the radius of the collar corresponds to the desired discontinuity depth. When the material removal member is a drilling member, such as a drill bit or plunger or the like, the guide, if present, is a spacer that functions as a stop. In lieu of the stop being a spacer, the stop may simply comprise a chuck of the tool into which the drilling member is secured. Accordingly, the desired aperture depth is distance from the stop to the exposed terminal end (i.e., the drilling end) of the drilling member minus the sum of the thickness of the template. As such, both the material removal members and the guide have a size associated with and/or corresponding to a desired aperture depth. The association and/or correspondence between the indicated sizes and the aperture depth is such that size of each the material removal member and the guide, together or independently, as well as the thickness of the template, may be adjusted to produce the desired aperture depth.

Particular embodiments of such methods include the step of forming one or more depth marking apertures within the tread by inserting the material removal member into each of the one or more openings in the template, the member being rotatably attached to the power tool and removing tire material to a desired depth for each aperture. Once the template is fixed into a desired location along the tire surface, and the selected power tool with the desired material removal member is directed into each of the openings in the template until reaching the desired depth of the corresponding aperture in the tire. In particular embodiments, the tool is directed into each of the openings in the template until the guide associated with the tool engages a top surface of the template.

Particular embodiments of such methods include the steps of removing the template from the tire surface, and removing the remaining tire material within the patch receiving area to an approximate depth of the one or more apertures. The depth marking apertures are formed within the patch receiving area to act as depth guides for an operator, whereby an operator removes material within the patch receiving area until reaching the depth or approximate depth of a depth marking aperture. Once a plurality of depth marking apertures have been formed, the operator is able to move from one depth marking aperture to another as he or she is removing the material within the patch receiving area. In further embodiments, the step of removing is achieved by abrading the remaining tire material within the patch receiving area to the approximate depth of the one or more apertures previously formed in the patch receiving area. In lieu of abrading the remaining material, in other embodiments, any other known means of removing the remaining material may be employed, such as, for example, cutting or peeling.

In particular embodiments, before removing the template from the tire, such methods include the step of forming one or more discontinuities about at least a portion of the perimeter of the template to form at least a portion of a perimeter about the patch receiving area of the tire, the step of forming one or more discontinuities being achieved by translating a power tool along at least a portion of the perimeter of the template. By performing this step, at least a portion of the perimeter is formed utilizing the side edges of the template as an edge-guide to more accurately form the perimeter of the patch receiving area, in lieu of manually forming the perimeter as provided in the step of removing the remaining tire material from the patch receiving area. Any known cutting or abrading tool may be used to track or translate about at least a portion of the template perimeter. A stepped collar or stepped template side edge may be provided to better facilitate translation of the tool about the template perimeter. Instead of forming the step within the collar, a step may be formed in the template along any perimeter edge. Any portion of the patch receiving area perimeter not formed in this step may be formed manually in the step of removing the remaining tire material from the patch receiving area.

Once the patch receiving area has been completed by sufficiently removing all tire material to a desired depth, particular embodiments of such methods include securely applying a tire patch within the patch receiving area. Any desired patch may be secured to the tire within the tire patch receiving area by any method known to one of ordinary skill.

Exemplary embodiments of a depth marking template and material removal tool for use in performing such methods are discussed in further detail below.

Figure 1:
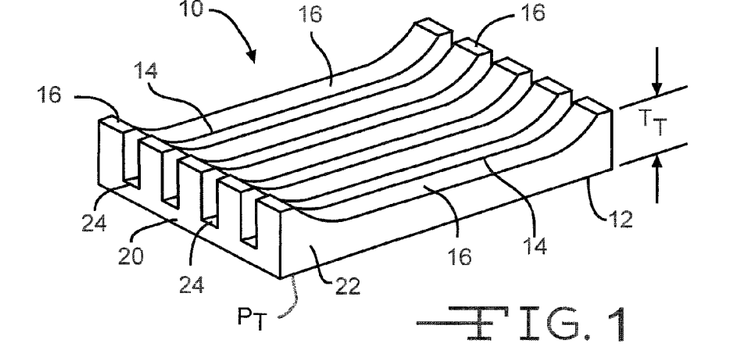
FIG. 1 is a perspective view of a depth marking template for forming a depth marking aperture in a tire, the aperture having a target depth corresponding to a desired depth of a tire patch receiving area according to a particular embodiment of the present invention.
Figure 2:
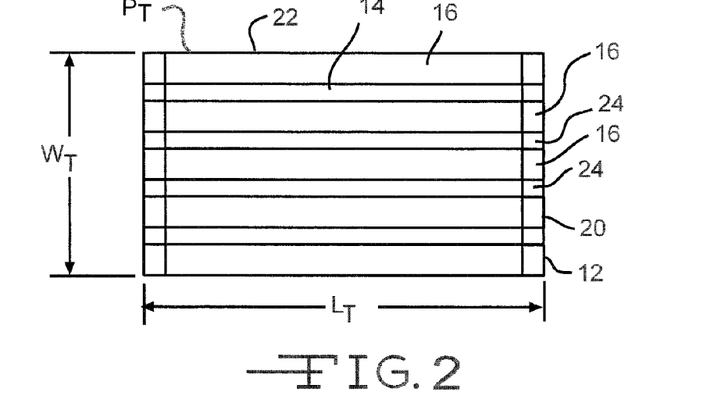
FIG. 2 is a top view of the depth marking template as shown in FIG. 1.
Figure 3:
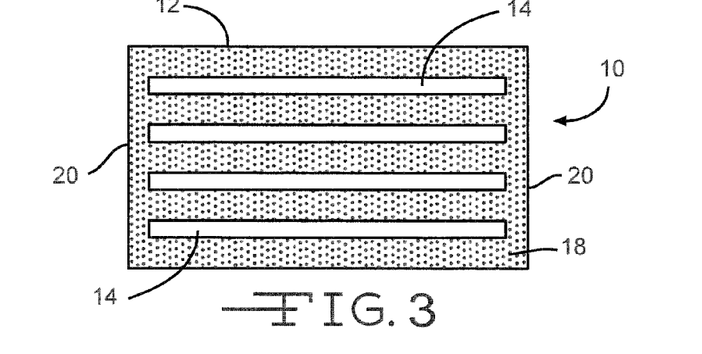
FIG. 3 is a bottom view of the depth marking template shown in FIG. 1, where the bottom surface is texturized according to a particular embodiment of the present invention.

A depth marking template 10 for use in performing the methods described herein is generally shown in FIGS. 1-3. The template 10 generally comprises a body 12 having one or more of openings 14 extending through a thickness of the body, between a top surface 16 and a bottom surface 18 of the body. In particular variations, the body 12 includes a plurality of openings 14 extending through the body thickness. Openings 14 are arranged to facilitate the corresponding formation of one or more depth marking apertures within a tire surface, and more specifically, within a patch receiving area. To facilitate the formation of these apertures, openings 14 are adapted to receive any desired material removing member (e.g., a cutting or abrading member) to allow such member to cut, slice, or abrade material from the tire to form a depth marking aperture having a desired depth. In particular embodiments, the desired (i.e., target) depth for any depth marking aperture is generally a depth approximating the desired depth of a patch receiving area to be formed or recessed within the tire surface. By approximating the desired depth of the patch receiving area, the desired depth of the patch receiving area is attained within a small amount of variation. Nonetheless, it is understood that any other desired depth may be selected, employed, and achieved according to these apparatus and methods. Because openings 14 are adapted to receive a material removal member, openings 14 may comprise any sufficient form adapted to receive the material removal member and any guide associated with such member. For example, with reference to FIGS. 1 and 2, openings 14 may form slots. By further example, with reference to FIG. 13, openings 14 may form holes 114.

Figure 14:
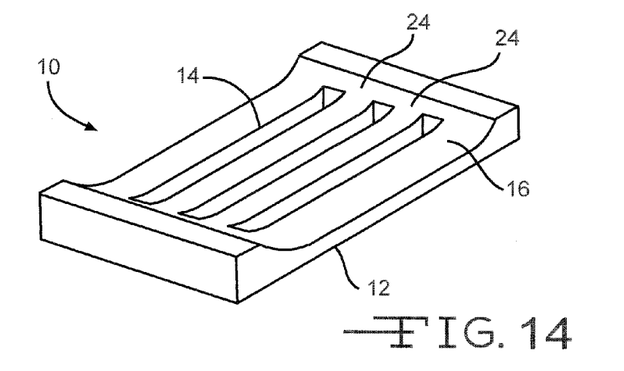
FIG. 14 is a perspective view of a depth marking template according to a particular embodiment of the present invention, where the slots are bounded at each end.

The use of slots as openings 14 allows an operator to remove more than a trivial amount of material with a single pass of the power tool. Slots also allow the operator to form defined paths at particular locations within the tire, such as when using the outermost slots to form at least a portion of a perimeter of the patch receiving area. Accordingly, it is understood that any of a variety of slot arrangements may be employed to achieve any desired arrangement of slotted apertures within the tire or the patch receiving area. With reference to the exemplary embodiment in FIGS. 1-3, template 10 includes a plurality of openings 14 forming slots extending longitudinally between opposing ends 20 of the template 10. Because the slots 14 extend end-to-end, one or more connectors 24 extend across each slot to ensure that template 10 remains unitary. Otherwise, the slots 14 would parse the template into separate independent pieces, which is not desired. It is understood that connectors 24 may extend along the terminal ends of slots 14 or at any intermediate location along the length of any slot 14, although doing so would prevent the tool from forming a corresponding aperture at the intermediate location of the connector 24. Specifically shown in FIGS. 1-3, each slot 14 includes a connector 24 extending across each slot end, which is contiguous with each template end 20. Connectors 24 may also extend a full thickness of the template, which is shown in a particular embodiment in FIG. 14, or partially through any thickness of the template, such as when a slot extends above the connector, which is exemplarily shown in the embodiment of FIGS. 1-3. If the slot extends over a connector, a local increase in template thickness may be needed to provide clearance for any material removal member passing through the slot above the connector. Otherwise, the material removal member may damage the connector and the integrity of the template. With continued reference to FIGS. 1-3, a local increase in the template thickness occurs to provide clearance for any material removal member.

Figure 15:
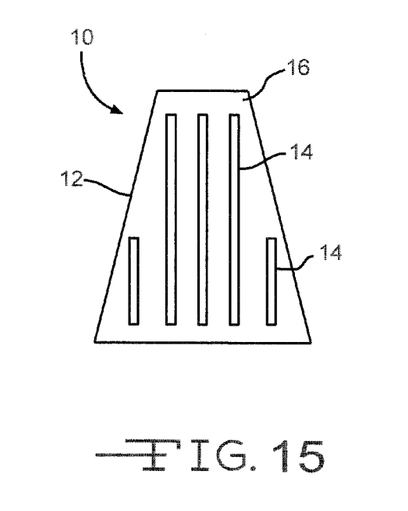
FIG. 15 is a top view of a depth marking template having a trapezoidal shaped perimeter according to a particular embodiment of the present invention.
Figure 16:
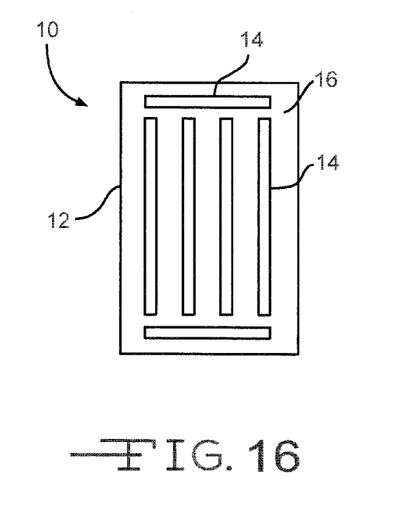
FIG. 16 is a top view of a depth marking template containing a plurality of slotted depth marking openings extending longitudinally between the template ends and a plurality of slotted depth marking openings extending laterally between the template sides, according to a particular embodiment of the present invention.

As mentioned previously, slots 14 may be formed and arranged within any template 10 as desired. For example, with reference to FIGS. 1-3, slots 14 are arranged in parallel relation to each other and evenly spaced in an array laterally between template sides 22. Slots 14 also are shown to have equal lengths and the same longitudinal arrangement within template 10. Nonetheless, it is understood that any other desired arrangement of slots may be employed, as different arrangements may be useful depending on the specific use, as tire sizes, shapes, constructions, conditions, and tire patches vary. Therefore, in other variations, slots 14 can extend in any other direction, including laterally across the template (as opposed to longitudinally between opposing ends 20), whether or not the slots are parallel or laterally spaced equally, and whether or not each slot extends linearly or non-linearly. A plurality of slots 14 may also have varying lengths, which may be useful when forming any patch receiving area that is non-rectangularly shaped. For example, FIG. 15 provides a trapezoidal-shaped template, where the slots extend different lengths. Further, a single template 10 may include both lateral and longitudinal slots, such as is shown by example in FIG. 16, which may be useful for forming at least a portion of the patch receiving area perimeter (such as when the template 10 is sized larger than the patch receiving area to properly arrange the outer slots along the perimeter). Template 10 may include one slot, as the patch receiving area may be sufficiently narrow to only effectively utilize the single slot. It is also understood that slots 14 may be differently shaped (for example, having differently sized widths and different cross-sectional shapes). Regardless of the form of the openings 14, the arrangement and size of the openings 14 may vary as desired. By further example, with reference to FIG. 13, holes 114 may be any size (in diameter) and may be arranged in any desired array or arbitrary arrangement.

Figure 9:
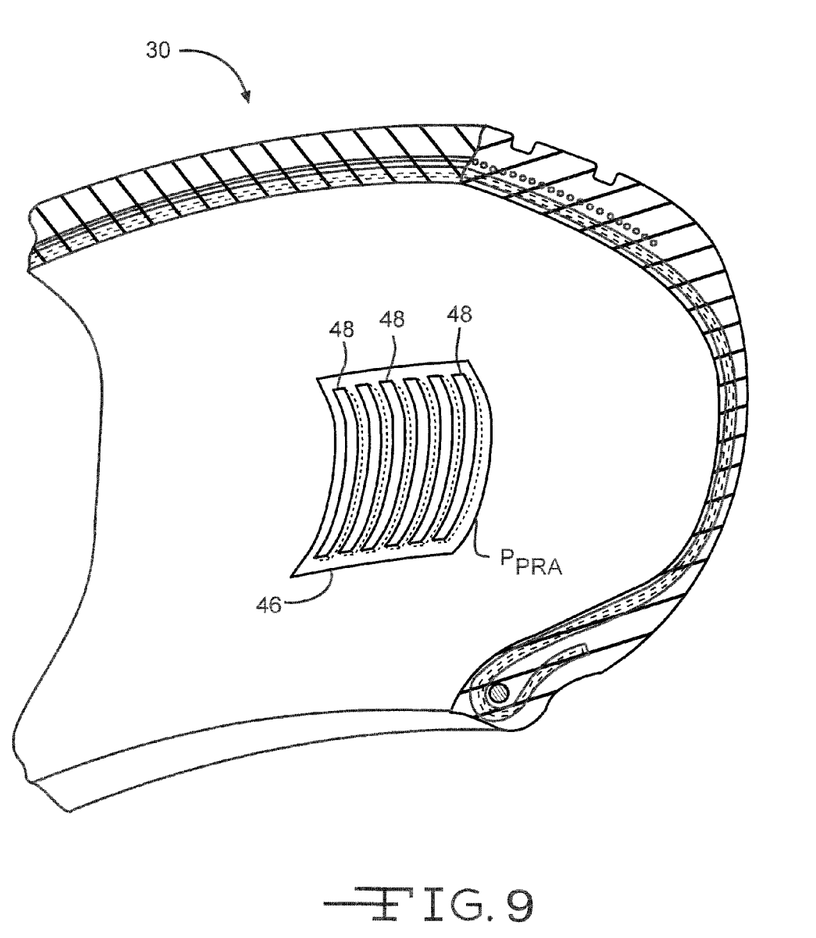
FIG. 9 is a perspective view of a patch application area containing a plurality of slotted depth marking apertures formed according to particular embodiments of the present invention.
Figure 12:
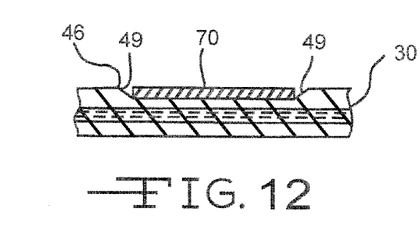
FIG. 12 is a cross-sectional view of a patch applied to the patch receiving area shown in FIG. 11, according to a particular embodiment of the present invention.
Figure 19:
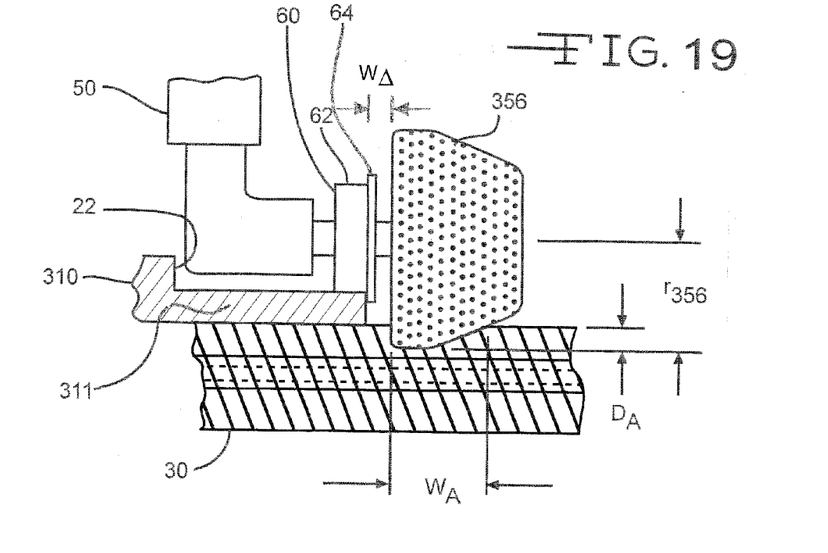
FIG. 19 is a cross-sectional view of a depth removal template arranged along a tire, where a material removal tool is engaging an outer edge of the template to remove tire material about a perimeter of the template according to an embodiment of the present invention.

It is understood that any template may form any shape about its perimeter. With reference to the embodiment of FIGS. 1-2, each template 10 has a width $W_T$, length $L_T$, thickness $T_T$, and a perimeter $P_T$ extending around the template to form a particular shape having a width and length commensurate with (i.e., similar or identical to) the width and length of the template. In particular embodiments, the template perimeter $P_T$ is approximately shaped to achieve a desired shape of the patch receiving area along the tire surface, which, in particular embodiments, allows an operator to mark an outline of the patch receiving area along the tire surface by forming or tracing a mark about the template perimeter $P_T$ upon the tire surface. It is understood that the entire template perimeter $P_T$, or any portion thereof, may be translated to the tire surface by any desired marking tool, such as an ink or paint pen or another tool to abrade or score the tire surface. In other variations, perimeter $P_T$ is approximately shaped to the shape of the patch to be applied to the tire, whereby the shaped perimeter $P_T$ is sized larger, equal to, or less than the patch size. For example, the perimeter $P_T$ may be oversized, such as when one or more openings 14 are arranged to form one or more sides of the patch receiving area perimeter. See FIG. 9 for an exemplary marking 46 identifying the perimeter of the patch receiving area $P_{PRA}$, which is also the template perimeter $P_T$ in particular embodiments, and FIG. 12 showing a patch receiving area oversized in relation to the patch. In other variations, the template perimeter $P_T$ is undersized, such as when a material abrading tool translates about the perimeter $P_T$ to remove tire material about at least a portion of the perimeter $P_T$ to form a perimeter of the patch receiving area. (See FIG. 19, for example). Accordingly, it is understood that perimeter $P_T$ may form any sized shape as desired, such as a polygon or an ellipse, for example, whether or not the perimeter $P_T$ is designed to match or represent the patch receiving area perimeter $P_{PRA}$.

Figure 11:
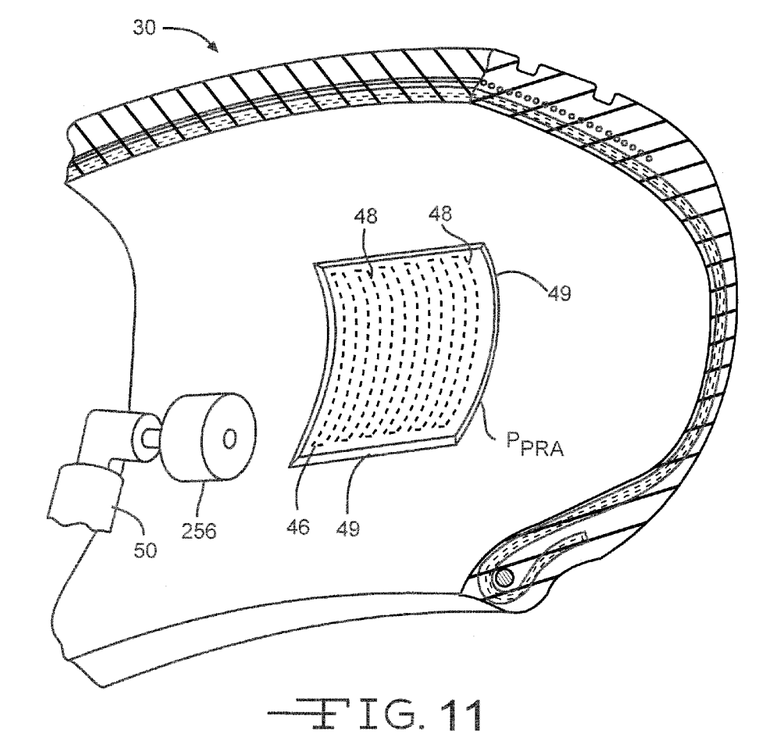
FIG. 11 is a perspective view of the tire and patch area, where the remaining material has been removed from the patch receiving area to the approximate depth of the slots as exemplarily shown in FIG. 10, the depth of the previously existing slots being shown by dashed lines.

The template thickness $T_T$ can be used to control the depth of any resultant depth marking aperture formed in the adjacent tire surface. Accordingly, the thickness $T_T$ of the template 10 may vary as necessary in any direction along the template (for example, longitudinally or laterally) to obtain the desired depth $D_A$ for any depth marking aperture in a tire. Accordingly, it is understood that template thickness $T_T$ may be constant or variable. For example, FIGS. 1-3 provide a template 10 having a variable thickness $T_T$. In this example, the thickness varies from a maximum thickness at a first end 20 to a minimum thickness along an intermediate portion of template 10, with a curvilinear portion extending between the maximum thickness and the minimum thickness. This may be useful, for example, when it is desirous to taper a perimeter $P_{PRA}$ of the patch receiving area from the tire surface to a desired depth within the patch receiving area (a taper 49 is shown in FIGS. 11-12, for example), or to adapt to a variable thickness tire patch. The variable thickness may extend in any fashion, such as varying linearly or curvilinearly, for example.

As discussed above, in particular embodiments, depth marking template 10 is flexible and capable of bending and adapting to one or more curvatures in the tire, and may be formed from any flexible and/or resilient material known to one of ordinary skill in the art. In alternative embodiments, it is also possible to form template from a more rigid material that generally resists any bending, whereby the template is formed to approximate or match a surface of the tire. The template may also form a composite. In view of the material or materials used to form the template, any process known to one of ordinary skill may be employed to form any template.

Figure 17:
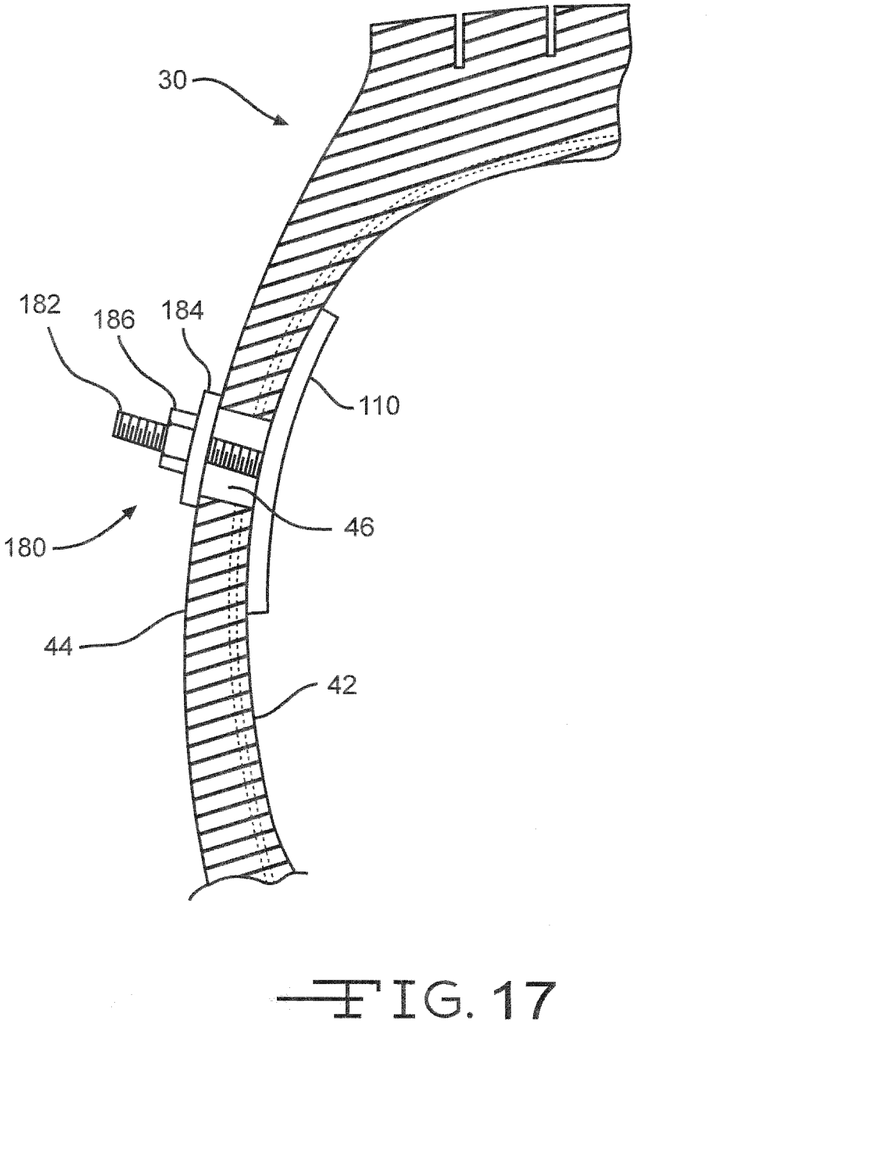
FIG. 17 is a partial cross-sectional side view of a template being retained along the tire by a means for securing the template, according to an embodiment of the present invention.

To facilitate the formation of depth marking apertures according to a desired depth within a tire, the template is applied and maintained or fixed into a desired position along the tire. Fixing the template to the tire may be achieved in any manner known to one of ordinary skill in the art as discussed above. With reference to FIG. 3, for example, the bottom 18 surface may be textured to resist any sliding or other movement from a desired arrangement once fixed into position. Bottom surface 18 may be texturized according to any method known to one of ordinary skill in the art as discussed above. Fixing (i.e., maintaining) any template in a desired position along the tire may comprise securing the template against the tire using any means for securing known to one of ordinary skill. With reference to FIG. 17, in a particular embodiment the means for securing 180 may be adapted to secure the template to the tire through an aperture 80 extending through the tire 30. Aperture 80 may be associated with a damaged portion of the tire, for example. In the embodiment shown, the means for securing 180 may include a threaded shaft 182, a washer 184, and a nut 186. It may be desirous to also minimize any rotational movement of the template once it is secured to the tire. Therefore, a second means for securing may be employed, such as providing a fastener (e.g. a second shaft, washer, and nut) spaced apart from the first means and within the tire aperture for rotationally securing the template to the tire.

Figure 18:
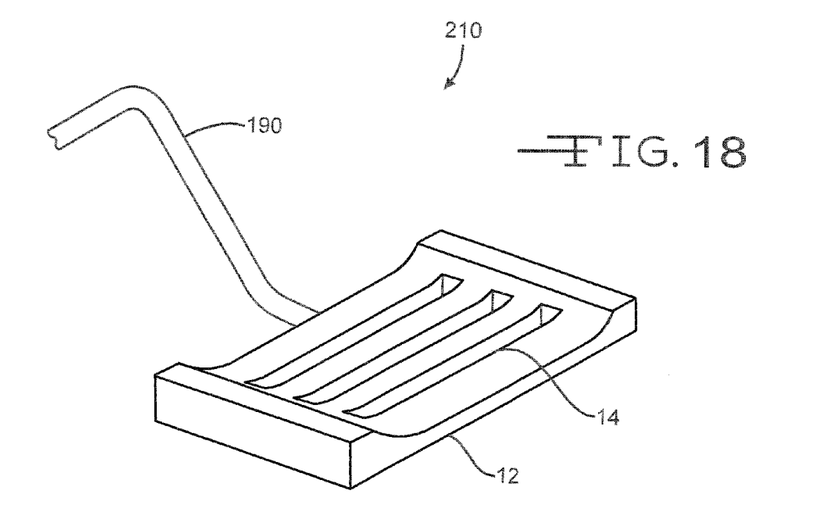
FIG. 18 is a perspective view of a template having a handle according to an embodiment of the present invention.

To assist in manually maintaining a template against a tire surface in a desired position, template may include one or more handle portions extending from any surface of the template. In an exemplary embodiment shown in FIG. 18, a handle portion 190 extends from template 210. Any other handle or means for handling any template known to one of ordinary skill may be employed.

Figure 4:
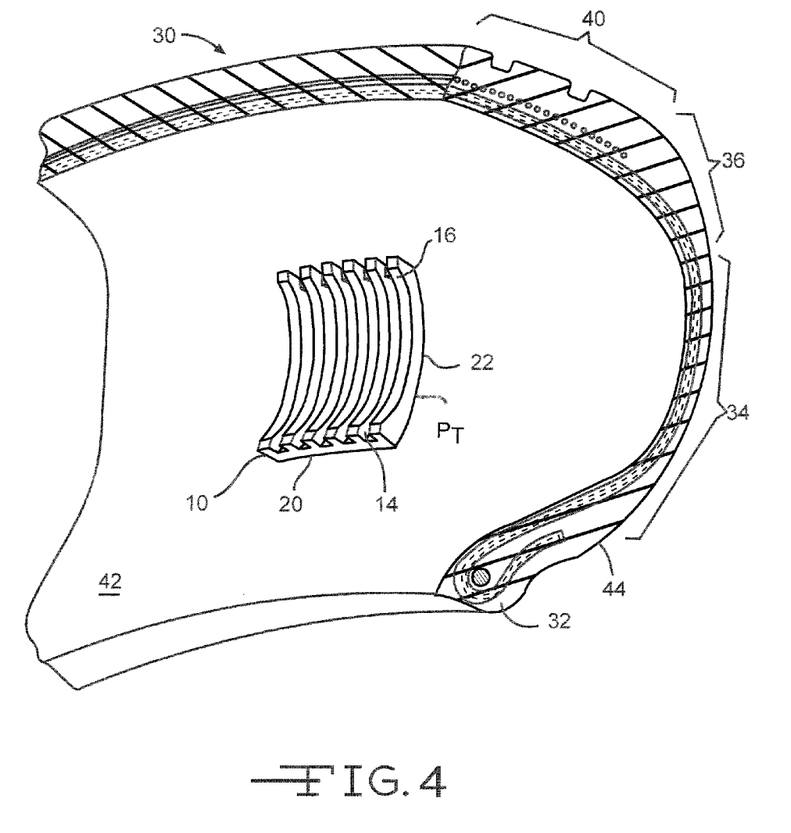
FIG. 4 is a perspective view of a depth marking template being applied to an interior surface of a tire, according to a particular embodiment of the present invention.

With reference to FIG. 4, a template 10 is shown applied to an interior surface 42 (i.e., an outer or exposed surface of the tire interior) of the sidewall area 34. Template 10 is arranged with the slots 14 extending in a radial direction of the tire 30; however, it is understood that template 10 may be arranged in any manner along any tire surface, whereby the openings or slots 14 are arranged in any desired manner relative to the tire. It is also understood that template 10 may be used on any surface of the tire, regardless of whether it is positioned on any interior tire surface 42 or any exterior tire surface 44 of the sidewall area 34, the shoulder area 36, or the tread area 40.

Figure 5:
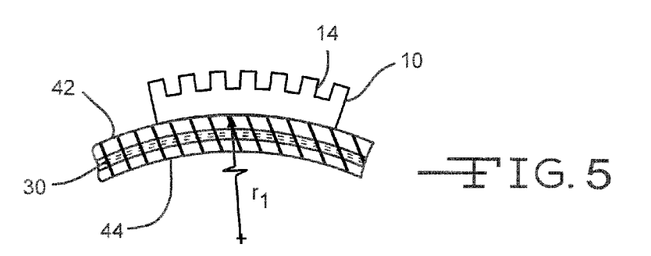
FIG. 5 is an end view of the depth marking template as viewed from the bead area of FIG. 4.
Figure 6:
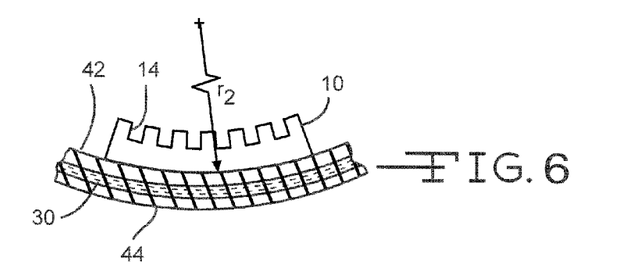
FIG. 6 is an end view of the depth marking template as viewed from the tread area of FIG. 4.

Because a tire is generally torus-shaped, many of its surfaces are contoured or curved. Even further, many tire surfaces are defined by or experience contours or curvatures that vary in different directions, that is, the contour is not constant or the surface is a multi-contoured surface. For example, with reference to FIGS. 5-6, an exemplary template is shown being applied to an interior tire surface 42. Clearly, there is a curvature in the radial direction of the tire (most clearly shown in FIGS. 4 and 7), which is also the lengthwise direction of the template 10 in this exemplary arrangement. However, when extending circumferentially along the tire sidewall 34 (that is extending laterally along the template or perpendicular to the radial direction), different contours or curvatures may arise along the length $L_T$ of the template. More specifically by example with reference to FIG. 5, which is an overemphasized end view of template 10 closest to bead area 32, the corresponding tire surface may have a circumferential curvature defined by $r_1$. By further example, with reference to FIG. 6, the circumferential curvature of the surface corresponding to the opposing end 20 of template 10 (i.e., the surface near the should of the tire sidewall) may have a different curvature defined by $r_2$, where the origins for $r_1$ and $r_2$ are located on opposite sides of the tire surface.

Figure 7:
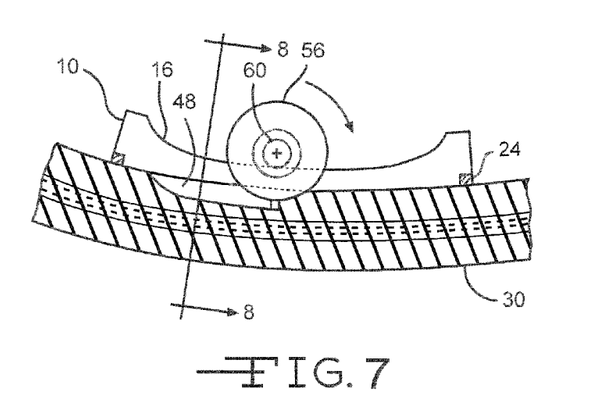
FIG. 7 is a cross-sectional view of the depth marking template and tire 7 of FIG. 4 with a rotary power tool being employed to form a slotted depth marking aperture in the tire while engaging the depth marking template according to a particular embodiment of the present invention.
Figure 8A:
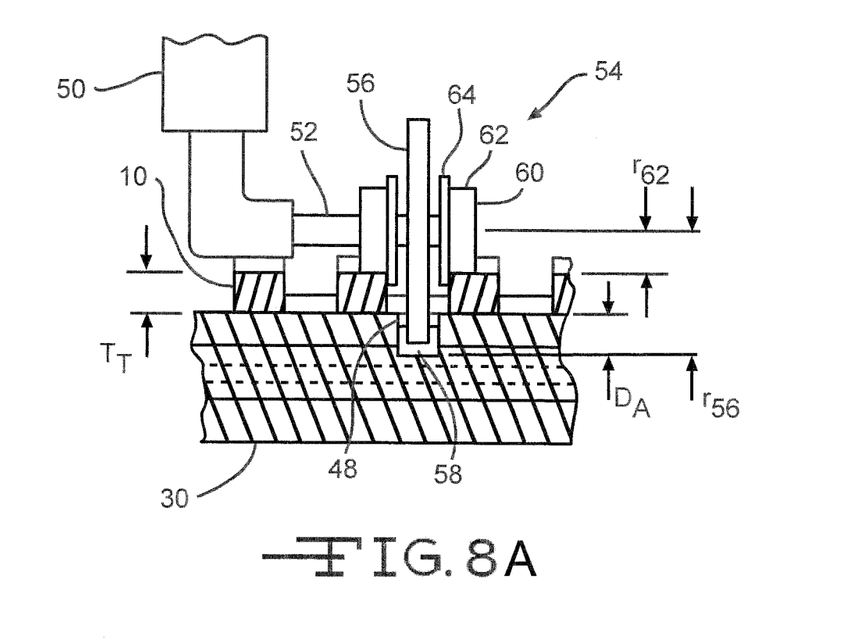
FIG. 8A is a cross-sectional view of the power tool forming the slotted depth marking aperture in the tire as taken along line 8-8 in FIG. 7.
Figure 8B:
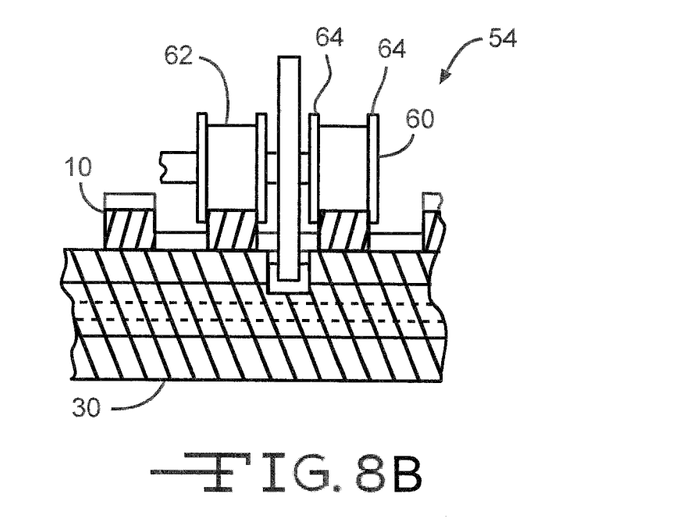
FIG. 8B is a cross-sectional view of an alternative embodiment to the depth marking tool shown in FIG. 8A, where each guide or collar includes a pair of annular extensions spaced apart along the engaging surface of the guide.

Once the template is fixed along a tire surface, with reference to FIGS. 7-8B, a material removal member 56 may be inserted into any template opening 14 to create a depth marking aperture 48 within the desired tire surface. The figures show an aperture 48 being formed by a tangential material removal member 56, which consists of a cutting disk having a tooth or blade 58 extending from an outer radius of the member 56 to form a cutting radius $r_{56}$. A tangential material removal member 56 generally comprises a rotary disk, drum, cylinder, or any other rotational member known to one of ordinary skill in the art that cuts or abrades (i.e., with a blade, cutting edge, or texturized or abrasive surface) along an outer radius or diameter of the member 56, where the depth $D_A$ of any corresponding aperture 48 being formed extends generally in a direction normal or perpendicular to the rotational axis of the material removal member 56. In operation, material removal member 56 may enter the template opening 14 at any juncture along the slot, whether at the template end 20 as depicted or at any intermediate location. Material removal member 56 is inserted until a portion of the tool 50 or any guide 60 installed thereon engages template 10, such as along top surface 16, for example. Once engaged with template 10, power tool 50 translates material removal member 56 along any desired length of slot 14 to form a slotted aperture 48 within tire 30.

Figure 13:
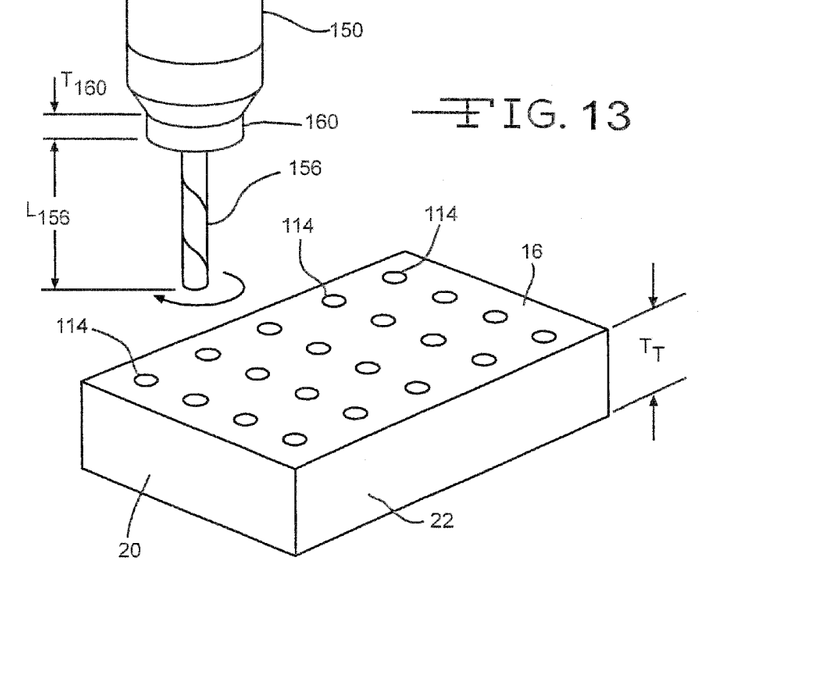
FIG. 13 is a perspective view of a depth marking template and a rotary power tool according to a particular embodiment of the present invention, where the plurality of openings in the template are holes and the material removal member of the tool has an axis of rotation coaxial with any hole in which it enters, the material removal member being adapted to penetrate said holes to create depth marking apertures in a direction of the axis of rotation according to a particular embodiment of the present invention.

In other embodiments, such as in FIG. 13, where the material removal member 56 is an axial material removal member, the power tool 50 inserts the member 156 into a template opening 14 until reaching a guide 60, which operates to limit the penetration according to a desired depth $D_A$. An axial material removal member may be a drill, plunger cutter, or any other cutting or abrading member known to one of ordinary skill in the art that is able to cut or abrade along an end surface of the member to remove material while moving in the direction of the member's rotational axis. The guide 60 may be a rotatable collar, a collar having one or more rotatable surfaces, a non-rotatable spacer, or any other means of stopping the further penetration of the material removal member 56.

With further reference to FIGS. 7-8B, depth marking aperture 48 is formed to a desired depth $D_A$ by employing a tangential material removal member 56 forming a rotational disk having a blade or cutting tooth 58 removing material along its outer radius $r_{56}$ to aperture depth $D_A$. In the exemplary embodiment shown, the final aperture depth $D_A$ is determined by calculating the difference between material removal member cutting radius $r_{56}$ and the sum of the guide stop radius $r_{62}$ and the local template thickness $T_T$ ($D_A = r_{56} - r_{62} - T_T$). With reference to the embodiment of FIG. 13, the aperture final depth $D_A$ is determined by calculating the difference between the cutting length of the material removal member $L_{156}$ (extending beyond the tool chuck or any guide 156 having a thickness of $T_{156}$) and the template thickness $T_T$. Accordingly, the selected template 10, the material removal member 56, 156, and any guide 60, 160 will affect the depth $D_A$ of any aperture 48 formed in the tire.

Once an aperture is formed in any tire, the process continues until all desired apertures are formed. This may entail using more than one depth marking template. While the template is engaged with the tire surface, a part of or the entire template perimeter may be marked onto the tire surface to identify the patch receiving area. Such markings may be used by an operator as a guide to limit his or her removal of tire material, as an operator may not want to remove material outside the patch receiving area. With reference to the example in FIG. 9, a tire 30 is shown having formed therein a plurality of apertures 48 and a marked perimeter $P_{PRA}$ identifying the patch receiving area 46 along interior tire surface 42.

It is understood that at least a portion of the patch receiving area perimeter may be formed by tracing or translating a material removal tool about at least a portion of a perimeter of a depth marking template. The tool may remove material to any desired depth, including the desired depth of the patch receiving area or the depth of a marking aperture. With reference to the exemplary embodiment in FIG. 19, a material receiving tool 50 having a material removal member 356 is positioned along the perimeter of template 310, and more specifically, along a side 22 of the template. Tool 50 may translate along any portion of the template perimeter, and may engage any body surface, including an extension (or track) 311 protruding from any side 22 or end 20 of the template. Extension 311 may be useful to provide a uniform thickness when other portions of the template body are of variable thickness, for example, although any extension 311 may be of variable thickness. It is understood that extension 311 may extend about any portion of the template perimeter, or about the entire template perimeter. Whether or not using any extension 311, the size of template may be reduced to achieve a desired perimeter, as the material removal member extends outwardly from the template body. For example, if desiring a patch receiving area having a particular width and if desiring to translate the material removal tool along both sides of the template width, the template width would be equal to the desired patch receiving area width minus twice the sum of the effective cut width $W_A$ of removal member 356 and the distance $W_A$ separating template 310 and removal member 356.

Figure 10:
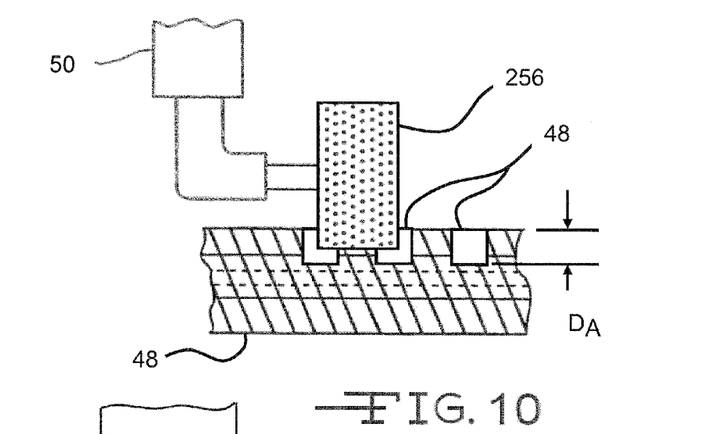
FIG. 10 is a sectional view of a tire having depth marking apertures formed therein according to particular embodiments of the invention, where the material remaining within the patch receiving area is being removed with a material removal tool to the depth of the depth marking apertures according to particular embodiments of the present invention.

After forming all desired apertures 48 in the tire, the material remaining within the patch receiving area is removed according to any known method to the depth of any aperture. It is envisioned that the remaining material may be removed by any technique known to one of ordinary skill in the art. For example, the material may be peeled away with a force F sufficient to overcome the bond between the material and the tire. By further example, with reference to FIGS. 10-11, a power tool 50 having a material removal member 256 may be employed for removing any remaining material to the desired aperture depth $D_A$ within the patch receiving area 46. In particular embodiments, an operator uses tool 256 to remove material until reaching an aperture depth $D_A$, and continues removing material to the depths of any other apertures 48 until the material within the patch receiving area is sufficiently removed. Any known material removal member known to one of ordinary skill in the art may be used, including those that may be used for material removal members 56, 156. The dashed lines in FIG. 11 represent the depth $D_A$ of each pre-existing aperture 48, which coincides with the final depth of the patch receiving area 46. In removing all desired material from patch receiving area 46, a part of or the entire perimeter $P_{PRA}$ may be tapered (i.e., a taper) to provide a gradual transition 49 from the initial tire surface 42 to the final depth of the patch receiving area 46. See FIG. 12 for alternative view of taper 49.

After preparation of the patch receiving area is completed, a patch is then installed within the patch receiving area 46 according to any method known to one of ordinary skill. An exemplary installation of a patch 70 within patch receiving area 46 is shown in FIG. 12.

In particular embodiments, a rotary power tool is used to form the depth marking apertures within the tire. With reference to exemplary embodiments shown in FIGS. 8A and 8B, a rotary power tool 50 includes a rotary output shaft 52 for transmitting rotational forces to an operably attached material removal member 56. To assist in positionally engaging the tool with depth marking template 10, one or more guides 60 may be used. In the embodiments shown, a pair of guides 60 are positioned on either side of material removal member 56. Guides 60 may be employed to control the penetration depth of the material removal member 56 into the tire based upon the size of the guide, and to ensure that the material removal member remains within the slotted template opening without damaging any portion of the template body 12 adjacent any slotted opening 14.

In the examples shown in FIGS. 8A and 8B, guide 60 is a rotatable collar capable of rotation independent of output shaft 52. To provide independent rotation, collar 60 may utilize a bearing positioned between the rotatable collar 60 and output shaft 52. The bearing may comprise any bearing known to one of ordinary skill in the art, such as, for example, any bushing, ball bearing, fluid bearing, magnetic bearing, needle bearing. The collar 60 includes an annular outer surface 62 for engaging template 10, and in particular embodiments, an annular extension 64 having a diameter greater than the diameter of the annular outer surface 62 for partial insertion into any slotted opening 14 of template 10. The annular extension 64 attempts to maintain the material removal member 56 within the slot 14 to prevent any damage to the template body 12 surrounding the slot 14. In the particular embodiment shown, collar 60 and the material removal member 56 are coaxial with the rotary output shaft 52. In an alternative embodiment, collar 60 may not include any extension 64, but instead, slots 14 in template 10 may include a shallow recess (not shown) positioned along either side of slot 14 and extending along the length of slot 14, wherein the cylindrical guide 60 can ride to control the translation of the material removal member 56 by allowing the recesses to prevent the guide from deviating laterally, in lieu of having the annular extension 64 perform the same function in the previously discussed embodiment.

It is understood that any means known to one of ordinary skill in the art may be employed to operably retain material removal member 56 and any collar 60 in a desired position along output shaft 52. For example, the output shaft may have a shank adapted to fit within a chuck of a rotary shank. The shank may then be inserted into a variety of rotary tools, for example hand drills, powered screwdrivers, and hand grinders. It is also contemplated that the shaft may be fixtured such that a rotary source perpendicular to the shaft may be used to drive the tool, such as is shown by example in FIG. 8. In particular embodiments, the means for retaining may be, for example, a snap ring, a bushing, or any other device configured to be operably attached to a shaft at a fixed position. It is understood the means may allow any material removal member 56 and/or collar 60 to be selectively positionable along the output shaft to accommodate differently dimensioned templates. It is also understood that any collar 60 having an annular extension 64 may comprise two or more independent collars, whereby the extension 64 and the annular template-engaging surface 62 are separate annular members. Member 56, any guide 60, with any shaft 52 form head 54.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method of preparing a tire surface for receiving a tire patch, the method comprising the steps of:
    selecting a single depth marking template from a plurality of depth marking templates for use in forming a plurality of depth marking apertures within a tire surface and within a tire patch receiving area of a tire, each of the plurality of depth marking apertures having a desired depth corresponding to a desired depth of the tire patch receiving area, the single depth marking template having a plurality of openings each extending through a thickness of the single depth marking template;
    selecting a material removal member for attachment to a power tool, the removal member being capable of forming the plurality of depth marking apertures into the tire surface using the single depth marking template;

engaging the single depth marking template against the tire surface;

forming the plurality of depth marking apertures which extend into the tire their desired depths to assist in formation of the tire patch receiving area within the tire by inserting the material removal member into each of the plurality of openings in the single depth marking template and removing tire material from the tire to the desired depth for each aperture, the material removal member being rotatably attached to the power tool;

removing the single depth marking template from the tire surface; and removing remaining tire material which is integral with the tire between the apertures and within the tire patch receiving area using a material removal apparatus to an approximate depth of the plurality of depth marking apertures after the step of removing the single depth marking template, wherein each opening has the form of a slot and the single depth marking template includes a first connector arranged at a first end of each of the slots and a second connector arranged at a second end of each of the slots, the first end and the second end at opposing ends of each of the slots;

the first and second connectors extending partially through the thickness of the single depth marking template and extending across the first end of each of the plurality of openings and the second end of each of the plurality of openings, respectively, with a void separating each of the first connector and the second connector from a material removal member engaging side of the single depth marking template; and wherein the step of forming the plurality of depth marking apertures includes engaging the selected material removal member along the material removal member engaging side of the single depth marking template and passing the selected material removal member through the void of the first connector, across the first connector, and into the plurality of openings of the single depth marking template.

2. The method of claim 1 further comprising the step of:
forming a mark on the tire surface about at least a portion of the single depth marking template to identify the tire patch receiving area on the tire surface.

3. The method of claim 2, wherein the step of forming a mark on the tire surface is accomplished by tracing at least a portion of a perimeter of the single depth marking template.

4. The method of claim 2, wherein a perimeter of the tire patch receiving area is generally the same size as a perimeter of the tire patch.

5. The method of claim 1, wherein a perimeter of the single depth marking template is shaped equal to the tire patch.

6. The method of claim 1 further comprising the step of:
selecting and installing a template-engaging guide from a plurality of template engaging guides onto the power tool, the guide being selected to engage the single depth marking template upon fully inserting the selected material removal member into any of the plurality of openings in the single depth marking template.

7. The method of claim 1, wherein the slots in the single depth marking template extend between opposing ends of the single depth marking template.

8. The method of claim 1, wherein the material removal apparatus for removing the remaining tire material within the tire patch receiving area is a heated knife that performs the step of removing remaining tire material by lacerating the remaining tire material.

9. The method of claim 1, wherein the slots in the single depth marking template have a variable depth.

10. The method of claim 1, wherein each of the plurality of depth marking apertures has one of two or more desired depths being employed by at least one depth marking aperture within the plurality of depth marking apertures.

11. The method of claim 1, wherein the single depth marking template is flexible.

12. The method of claim 1 further comprising the step of:
determining the desired depth for each of the depth marking apertures and selecting the appropriate single depth marking template from the plurality of depth marking templates, a tool guide, and the selected material removal member to achieve each desired aperture depth.

13. The method of claim 1 further comprising the step of:
forming one or more discontinuities about at least a portion of a perimeter of the single depth marking template to form at least a portion of a perimeter about the tire patch receiving area of the tire, the step of forming one or more discontinuities being achieved by translating the power tool along at least a portion of the perimeter of the single depth marking template.

14. The method of claim 1 further comprising the step of:
applying the patch within the tire patch receiving area of the tire.

\* \* \* \* \*